F. WHEAT.
ADDING MACHINE.
APPLICATION FILED MAY 24, 1910.
1,053,687.
Patented Feb. 18, 1913.
6 SHEETS—SHEET 4.
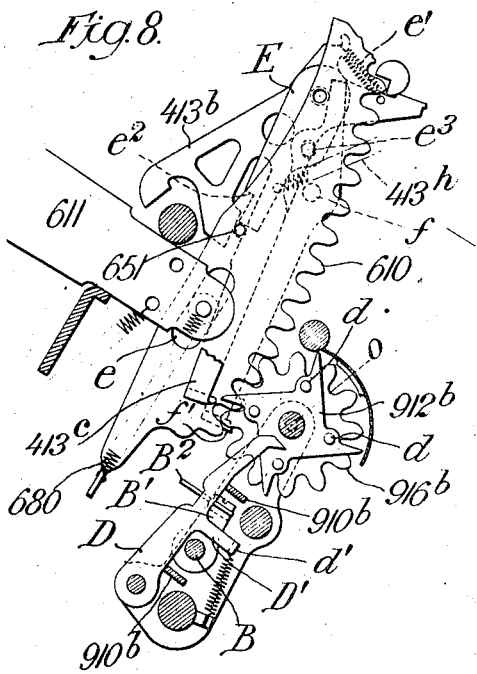
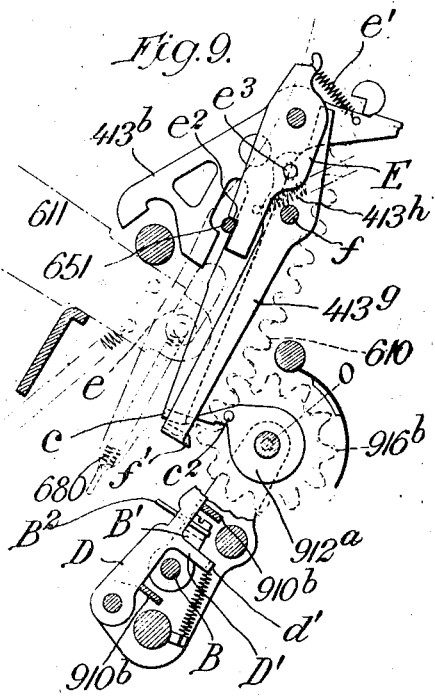
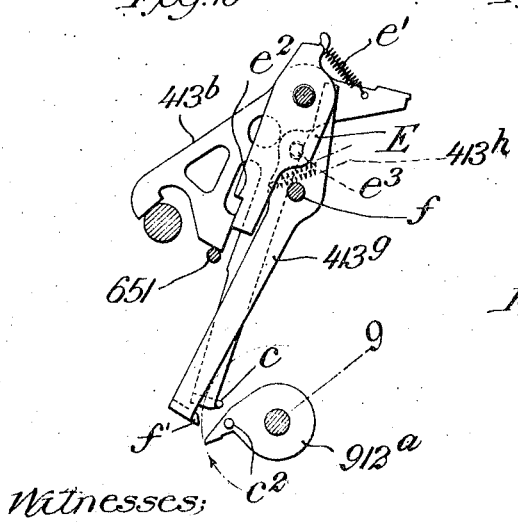
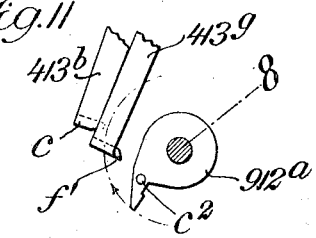
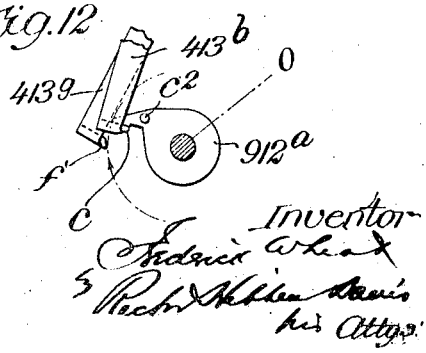

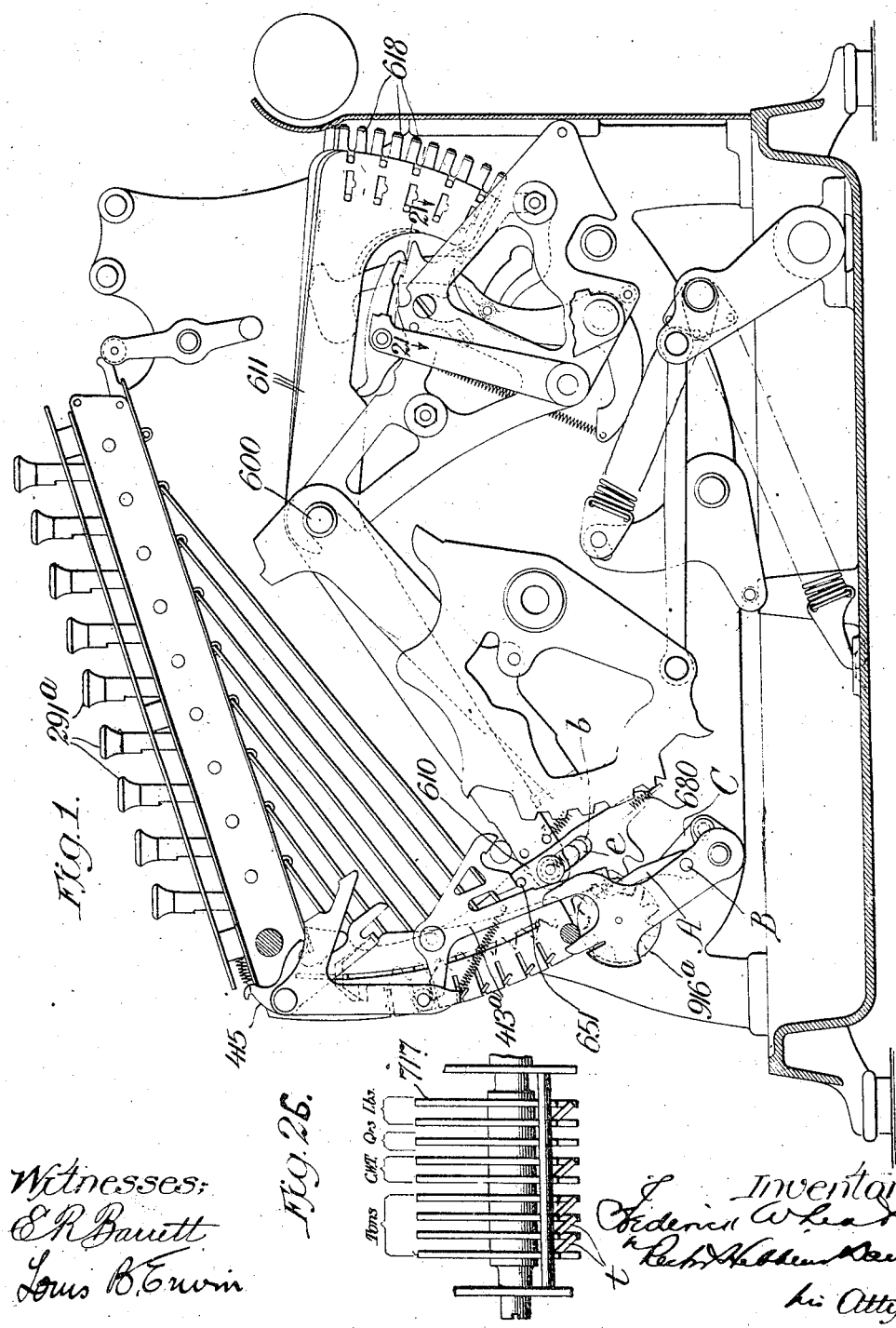

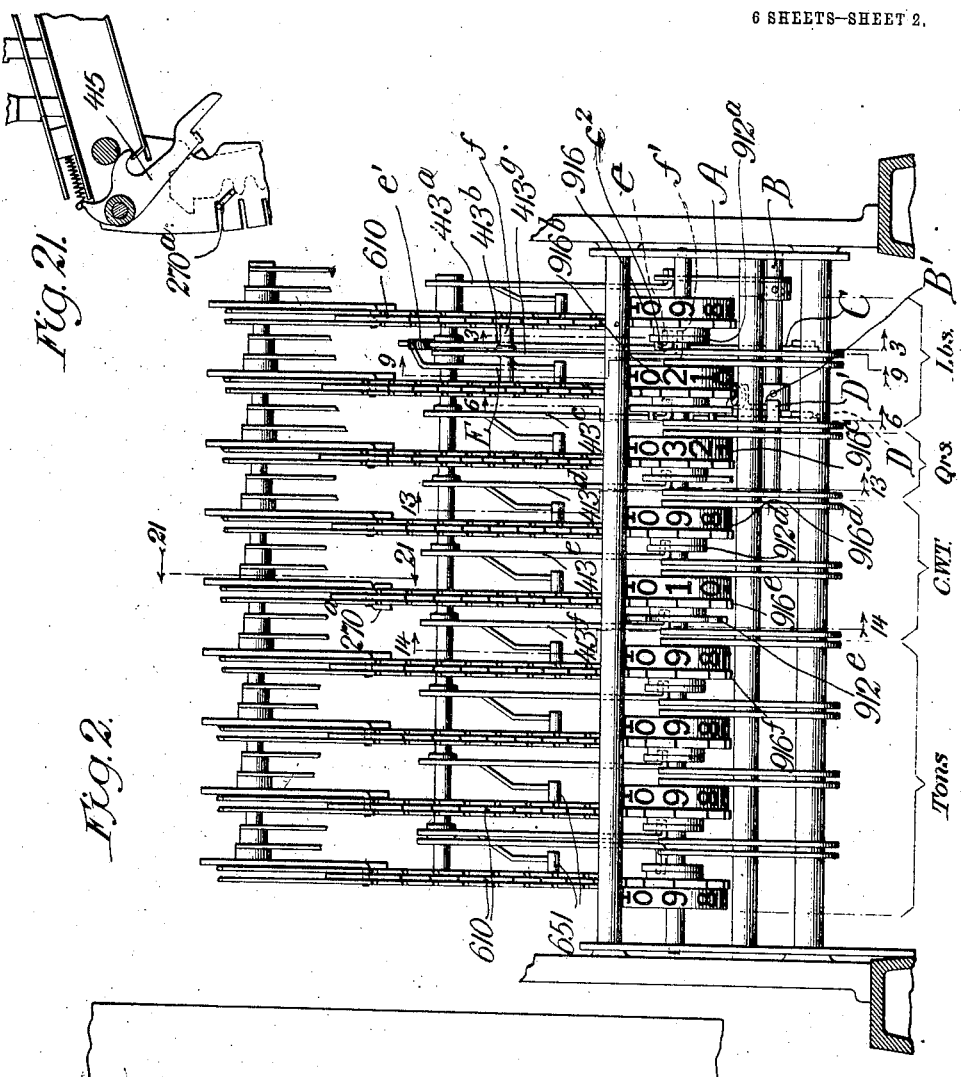

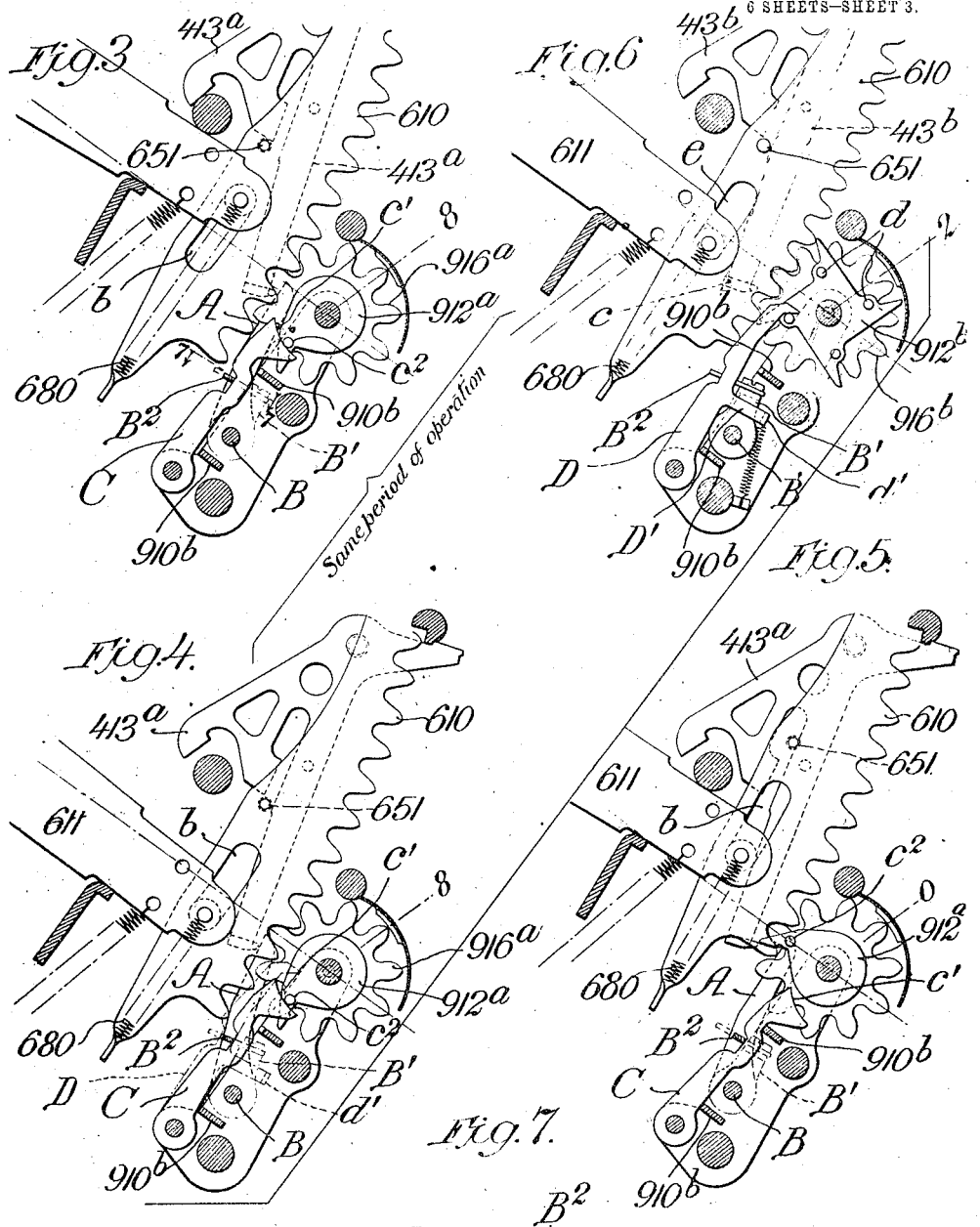

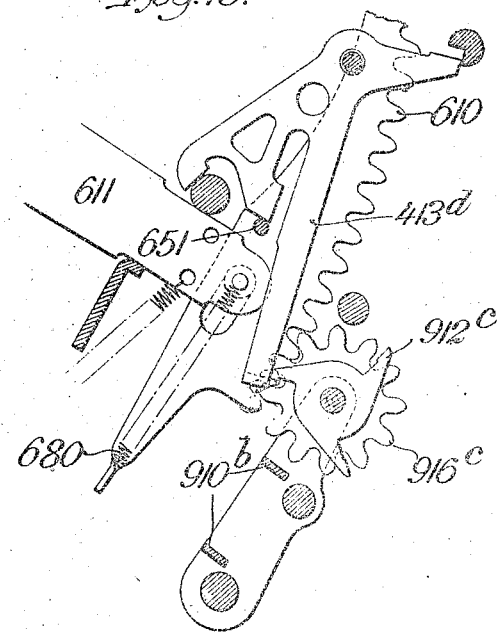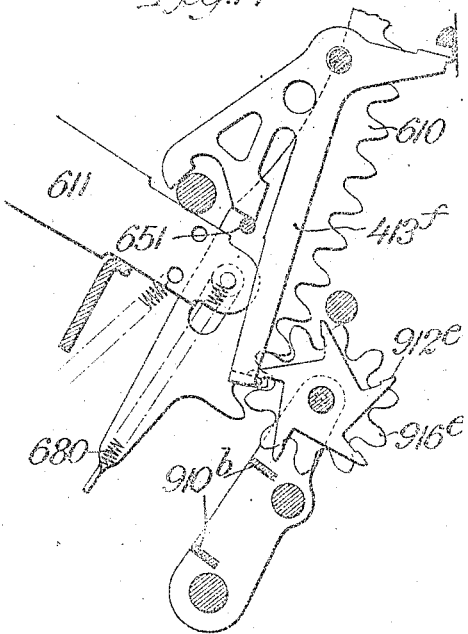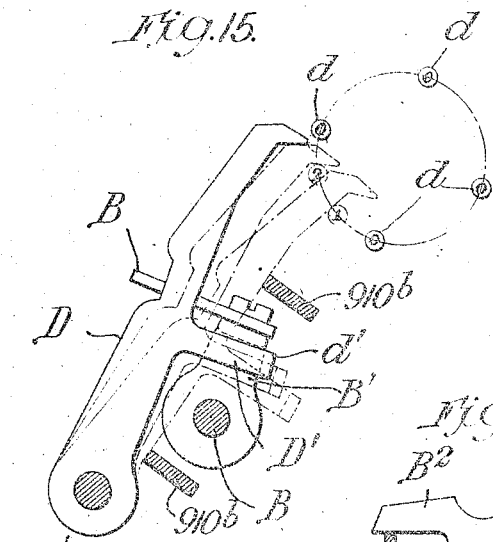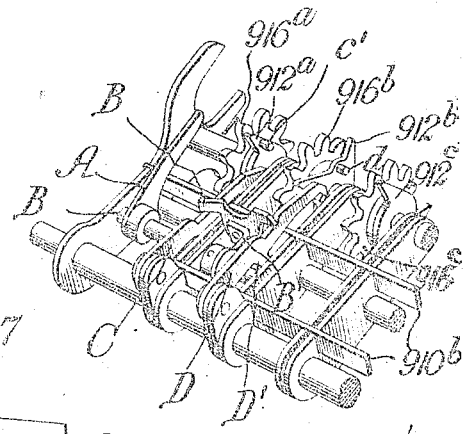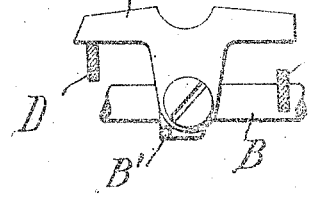

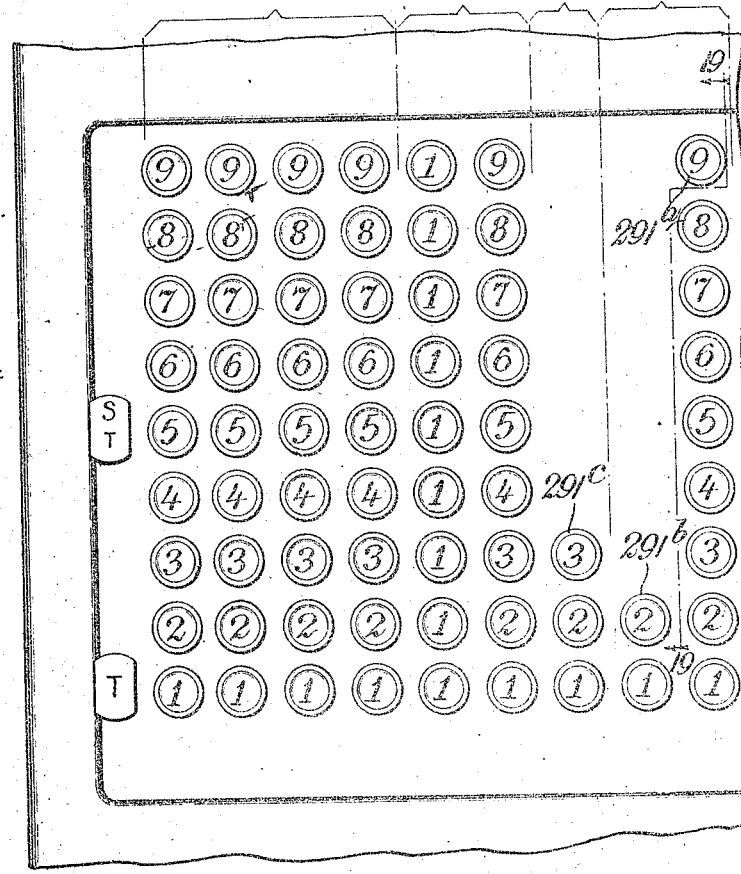
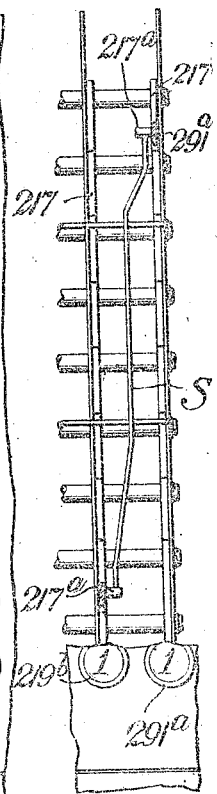
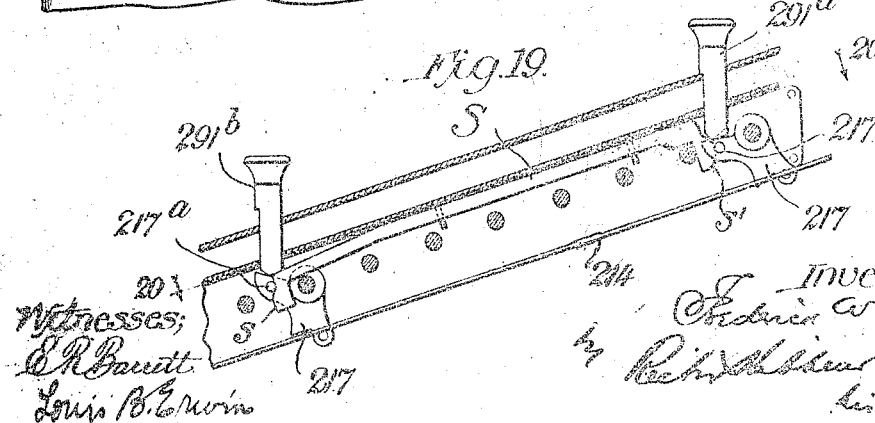

UNITED STATES PATENT OFFICE.

FREDERICK WHEAT, OF LONDON, ENGLAND, ASSIGNOR TO BURROUGHS ADDING MACHINE COMPANY, OF DETROIT, MICHIGAN, A CORPORATION OF MICHIGAN.

ADDING-MACHINE.

1,053,687.　　　　Specification of Letters Patent.　　Patented Feb. 18, 1913.

Application filed May 24, 1910. Serial No. 563,085.

*To all whom it may concern:*

Be it known that I, FREDERICK WHEAT, a subject of the King of England, residing at 65 High Holborn, London, England, have invented certain new and useful Improvements in Adding-Machines, of which the following is a specification.

The object of the present invention is to equip an adding machine for accumulating otherwise than according to the decimal system, as for example according to English standard or legal avoirdupois table of weight, in which twenty-eight pounds make one quarter, four quarters make 100-weight of 112 pounds, and twenty such hundred weights make one ton of 2240 pounds, commonly called a "long ton" as distinguished from the ton of 2,000 pounds or "short ton," which is the standard in America.
It will be obvious that in order to take care of amounts registered or accumulated according to such table considerable modification of transfer or carrying mechanism is required as compared with that suitable for a purely decimal system. Thus, in a machine employing the usual alined series of adding wheels, with every registration of 28 upon units and tens wheels there should be a carry to a wheel for registering quarters, while at the same time the units wheel must be capable of registering 8 or 9 pounds so that its movement one step beyond the 7 position should not result in a zero registration. Furthermore, in the case of registering by 10s alone, when the number of pounds exceeds that constituting one quarter, as for example 30 pounds, there should be a carry which will register on the units wheel the extra pounds. Then a double carry may be necessary on the tens wheel, as for example with the addition of 9 pounds on the units wheel when it and the tens wheel was already registering 19 pounds. In such case both wheels should move to the zero position and carry to the quarters wheel. In order to accomplish such results as above mentioned provision is made by the present invention for carrying backward and forward between the tens and units wheels and for a double carry from the units to the tens wheel.

The invention is here shown applied to the well-known Burroughs adding machine, in which carrying is done by return movement of racks beyond normal. Carrying mechanism of the usual character serves for carrying from one wheel to another across the series, as from the units wheel to the tens when the latter is not at the same time or has not already registered tens of pounds and from the tens wheel to the quarters wheel, the quarters wheel to the units of cwt. wheel, from the latter to the tens of cwt. wheel, from the latter to the units of tons wheel, and so on, though for accumulating according to the above-mentioned table of weight, as the invention is here shown embodied, the tens wheel has twelve teeth and in one complete revolution will trip the transfer mechanism of the quarters wheel four times, and the quarters wheel also has twelve teeth and is equipped to trip the transfer mechanism of the units of cwt. wheel three times in one complete rotation, and the tens of cwt. wheel is equipped to trip the transfer mechanism of the units of tons wheel five times in one complete rotation.

In the drawings which accompany and form part of this specification, Figure 1 represents in right side elevation a Burroughs machine embodying the present invention; Fig. 2 represents a considerable portion of the same in front elevation; Figs. 3, 4 and 5 are sections taken on the line 3—3 of Fig. 2 illustrating different relations of parts under different conditions; Fig. 6 is a section taken on the line 6—6 of Fig. 2 and corresponding with Fig. 4 as to the period of operation; Fig. 7 is a section taken on the line 7—7 of Fig. 3; Fig. 8 is a section taken on the same line as Fig. 6 but illustrating a different condition; Fig. 9 is a section taken on the line 9—9 of Fig. 2 illustrating what ensues in an operation as a result of precedent conditions such as illustrated in Fig. 8; Fig. 10 is a view somewhat similar to Fig. 9 but illustrating parts at normal; Figs. 11 and 12 are sectional views illustrating some of the parts which appear in Fig. 10 though differently related; Figs. 13 and 14 are sections taken on the line 13—13 and 14—14 of Fig. 2; Fig. 15 is a sectional and diagrammatic view, the section being taken on the same line as Figs. 6, 8 and 9; Fig. 16 is a perspective view of a portion of the accumulating mechanism viewed from above; Fig. 17 is a view similar to Fig. 7 but illustrating a different condition; Fig. 18 is a plan view of the keyboard of the machine; Fig. 19 is a section on the line 19—19 of Fig. 18; Fig. 20 is a section on the line 20—20 of Fig. 19; Fig. 21 (Sheet 2) is a vertical section taken substantially on the line 21—21 of Fig. 2; Figs. 22 to 25 show examples of recording, and Fig. 26 (Sheet 1) is a horizontal section taken substantially on line 26—26 of Fig. 1.

The accumulating wheels have the same location as in the ordinary and well-known Burroughs adding and listing machine and they engage with and disengage from a set of actuating racks in the usual manner and as fully explained in William S. Burroughs' Patent No. 504,963, issued September 12, 1893. Furthermore the arrangement for measuring descent of the racks by depression of amount keys is of the same character as that described in said patent and the primary transfer mechanism is also of the character disclosed in said patent. Thus, there are levers 611 loosely journaled upon a central rock shaft 600 which carries the usual restoring frame or bail 617, and segmental racks 610 have slot and pin engagement with said levers, and springs 680 tend to impel the racks upwardly beyond their normal positions, being restrained by pawls 413 which engage over studs 651 on the racks. Displacement of the pawls through rotation of associated wheels permits return movement of racks beyond normal for carrying purposes.

The first wheel at the right, designated 916$^a$, is of similar character to the ordinary accumulating wheel of the Burroughs machine in that its pinion has ten teeth and its periphery is inscribed from zero to 9. Correspondingly, there are nine keys (Fig. 18) in the first column or row of amount keys 291$^a$. Then, as in the ordinary machine, this units wheel 916$^a$ is adapted to cause a carry of 1 to the tens wheel 916$^b$ in moving from 9 to zero by reason of its cam disk 912$^a$ wiping past the foot $c$ of the transfer pawl 413$^b$ which normally restrains the rack engaging the pinion of the tens wheel 916$^b$. Thus the wheel 916$^a$ is capable of registering units of pounds up to 9 and then carrying to the tens wheel. Inasmuch as the latter is not to register beyond two tens of pounds or 20, its periphery, instead of being inscribed from zero to 9 is inscribed simply from zero to 2, this character of inscription being repeated four times and the cam disk 912$^b$ of this wheel being correspondingly constructed with four equi-distant acting portions to wipe past and displace the pawl 413$^c$ which normally restrains the rack of the quarters wheel 916$^c$. Correspondingly, there are but two amount keys 291$^b$ in the second or 10s row inscribed respectively 1 and 2. Inasmuch as the registration of four quarters entails a carry of 1 to the units of cwt. wheel, only three keys 291$^c$ are needed in the third row, inscribed respectively 1, 2 and 3 and, correspondingly, the quarters wheel 916$^c$ is inscribed from zero to 3, this being repeated three times on the periphery of this wheel and its pinion having twelve teeth and its cam 912$^c$, Fig. 13, having three equi-distant acting portions to displace the pawl 413$^d$ which normally restrains the rack of the units of cwt. wheel. The latter, 916$^d$, has a ten-tooth pinion and is inscribed from zero to 9 and its cam 912$^d$ trips the associated transfer pawl 413$^e$ once in a rotation as in the ordinary construction to cause a carry to the tens of cwt. wheel 916$^e$. Inasmuch as registration of 20 cwt. entails a transfer or carry of 1 to the units of tons wheel, said wheel 916$^e$ is merely inscribed with alternating 1s and zeros and as its pinion has ten teeth its cam 912$^e$ has five equi-distant acting portions as illustrated in Fig. 14 for acting upon the transfer pawl 413$^f$ of the units of tons wheel 916$^f$. The latter and the higher order tons wheels are of the ordinary type inscribed from zero to 9 and the transfer mechanism associated with them is the usual one. As the tens of cwt. wheel 916$^e$ would never be turned but a single step as measured by depression of a key, a single key would suffice, but for convenience nine keys are employed, as shown in Fig. 18, each however having only the function of withdrawing the rack-retaining latches 415. A single fixed stop 270$^a$ limits the descent of the rack.

In addition to transferring or carrying such as above mentioned, it becomes necessary to provide for carrying operations upon the units wheel 916$^a$ derived from the tens wheel when 10s only are being registered or both units and 10s, and also for effecting a double carry in a single operation upon the tens wheel. To this end special devices are provided which will now be described.

The first thing to be noted is that the rack of the units wheel has a slot $b$, Fig. 3, double the length of the usual slot as will be seen by comparison with Figs. 13 and 14, which slot $b$ provides for transfer movement of the units rack sufficient to turn the units wheel two steps instead of one. The necessity for this is explained by the fact that whenever this wheel turns to the point of registering eight pounds in conjunction with registration of 20 by the tens wheel 916$^b$ said units wheel should turn to zero and in order to do so it must be advanced two steps. Furthermore, in the event of 30 pounds being registered by successive depressions of a key or keys in the 10's of pounds row, the 2 pounds in excess of the quarter or 28 pounds should be registered upon the units wheel. The units transfer pawl is designated 413$^a$, Fig. 3, and it normally restrains the units rack in the ordinary way but of course cannot be displaced in the ordinary way because there is no wheel lower than the units wheel. It is displaced by a finger A which is secured to a rock shaft B journaled in the accumulator frame, said finger of course being normally swung forward as illustrated by dotted lines in Fig. 3. On the same rock shaft B there is secured a short arm B' which carries, swiveled to a laterally turned top portion, a cross-head B² Figs. 7 and 17. One branch of this cross-head extends in rear of an arm C associated with the units wheel 916ᵃ and the other branch of said cross-head extends in rear of an arm D associated with the tens wheel 916ᵇ, said arms being independently journaled between the dividing plates of the accumulator frame and normally resting against the tie strip 910ᵇ of said frame as illustrated in Figs. 5 and 8. The upper end of the arm C is widened and has a curved edge c' normally eccentric to the wheel 916ᵃ and lying in the path of movement of a laterally projecting stud c² on the cam disk 912ᵃ, the relationship being such that as the said wheel moves from a position registering 7 to a position registering 8 this stud will act upon said edge and rock the arm C to the position shown in Figs. 3 and 4, said edge being then brought concentric with the wheel. Normally the said arm C is spaced from the swivel cross-head B² as shown in Fig. 17 and also in Fig. 16, but such movement of the arm brings it into contact with said cross-head whose other branch is normally in engagement with the arm D as illustrated in Fig. 17. Now this movement of the arm C obviously effects no movement of the rock shaft B or finger A, though it does establish a relationship between the cross-head B² and said arm C which will result in movement of the said rock shaft and finger in the event that the tens wheel 916ᵇ moves far enough to register 2. The other arm D is under control of the tens wheel and if the latter moves to that extent it will move said arm D and, with the arm C back against the cross-head as in Fig. 7, rearward movement of the arm D would cause the cross-head to fulcrum upon the arm C and the result would be a rocking of the arm B', shaft B and finger A, and a consequent displacement of the pawl 413ᵃ, with the effect of turning the units wheel two steps forward. It will be understood that in such case the arm C is held against forward movement by reason of its engagement with the pin c². Rearward swinging of the arm D is effected by the engagement therewith of one or another of four equi-distant studs d, projecting laterally from the cam disk 912ᵇ, Fig. 6, and the relationship of parts is such (see diagram Fig. 15) that movement of the wheel 916ᵇ from zero to 1 simply moves the oncoming stud up to the arm without actuating the latter, whereas movement of the wheel from 1 to 2 swings the arm rearward far enough to bring about the action above described.

It will be seen from the above that should the 2 key in the 10's row and the 8 key in the units row be depressed and the handle of the machine pulled to register 28 pounds, the result would be that the units wheel, after having registered 8 pounds, would be turned on two steps farther so as to clear it or show its zero. This entails a carry to the tens wheel because the cam 912ᵃ in passing from 9 to zero will of course act upon the foot of the regular transfer pawl 413ᵇ which normally restrains the rack of the tens wheel. In consequence the tens wheel will also be cleared or advanced from the 2 to zero position. In every such movement of the tens wheel it in turn carries to the quarters wheel by reason of one point of its cam disk 912ᵇ wiping past the foot of the pawl 413ᶜ which normally restrains the rack of the quarters wheel. The same result is of course had in event 8 has been registered on the units wheel in one operation of the machine (Fig. 22) and 2 is then registered on the tens wheel in a succeeding operation. And a similar result would ensue if the reverse order of registration were followed, i. e. if 2 should be registered upon the tens wheel in one operation and 8 upon the units wheel in the succeeding operation though in such case the arm D would first move rearward carrying the cross-head B into engagement with the arm C, and then the latter in moving rearward would rock the shaft B, the arm D affording the fulcrum in this instance instead of the arm C as before described.

If instead of the registration of a quarter being effected as above described, it should be by successive depression of a key or keys of the tens row, then a double transfer would be equally necessary to the units wheel because there would be an excess of pounds over the quarter, as for example in depressing the 1 key of the tens row three times in succession or the 1 key and then the 2 key. As this of course would not involve movement of the units wheel to the 8 position and its consequent positioning of the arm C to afford a fulcrum for the cross-head B², initial means are provided for rocking the arm B', rock shaft B and finger A in such circumstances. Thus the arm D has a forward branch D' with a laterally turned end portion d' extending in front of the arm B' but spaced sufficiently therefrom so that in movement of the arm B accompanying turning of the tens wheel to the 2 position (see diagram Fig. 15) the laterally turned portion d' simply moves up to the arm B' but does not actuate the same. However, movement of the tens wheel farther, as in a third operation of the machine with the 1 key depressed, which would carry the wheel from 2 to zero, causes said laterally turned portion $d'$ of the arm D to act upon the arm B' and rock the same and the finger A so as to cause the double carry to the units wheel thereby registering two pounds upon the latter. The total would be 1 quarter 2 pounds, as shown on the example in Fig. 24, where the printing of the successive 10s of pounds is shown and the printing of the total. In Fig. 22 an example is given of a record of operations somewhat similar to those referred to in connection with the registration of 28 upon the units and tens wheels, though represented in this example as resulting from registration of 8 upon the units wheel in one operation and 2 upon the tens wheel in a succeeding operation with a total of one quarter. It is obvious, however, that the turning of the units and tens wheels to zero would come about in the same manner as above explained where it was prescribed that the 2 key in the tens row and the 8 key in the units row were both depressed and the handle pulled.

Still another condition is to be considered in connection with the turning of the units and tens wheels to zero by reason of registration of 28 pounds and that is such as the example in Fig. 23 represents. 19 pounds having been registered upon the units and tens wheels and then 9 pounds upon the units wheel, will of course mean an accumulation of 28 pounds and should entail a transfer to the quarter wheel and a clearing of the units and tens wheels. This requires further special devices, for the clearing of the tens wheel means a two step advance and it receives no advance by reason of depression of a key in its own bank. For the purpose of providing for a two step advance of the tens wheel in such case its rack is formed with a slot, $e$, of double the usual length or of approximately the same length as the elongated slot $b$ in the units rack, but as this tens rack only partakes of a two step rise beyond normal under conditions such as above mentioned, it is necessary to provide special means for limiting its rise to one step when only a single carry is called for to the tens wheel. The rack stud 651 is normally restrained by the pawl 413$^b$, Fig. 10 in the ordinary way and when in the example mentioned the units wheel passes from 9 to zero its cam 912$^a$ trips the pawl 413$^b$ so that the rack may rise. However, a special pawl E then stands in the path of the stud 651 to limit the rise of the rack to a single step as illustrated in Fig. 8. Said special pawl is pivoted concentrically with the pawl 413$^b$ and connected by a spring $e'$ with the forward arm of the latter. This pawl E is normally held against a forward edge of the pawl 413$^b$ by said spring as illustrated in Fig. 10 and presents its lower end edge to the stud 651 when the pawl 413$^b$ is displaced. At a point above this end edge there is a shoulder $e^2$ spaced from said end edge the same distance that the latter is spaced from the under edge of the pawl 413$^b$, or in other words spaced half the distance of the slot $e$. The rotation of the units wheel nine steps to the 8 position and the consequent tripping of its own transfer pawl, in such manner as hereinbefore described, causing it again to pass from 9 to zero, will result in a displacement of the auxiliary pawl E and the removal of the lower end edge of the latter from engagement with the stud 651 so as to permit the full rise of the rack as illustrated in Fig. 9. This is effected through the medium of an arm 413$^g$ pivoted to the framework at $f$, Fig. 9, and having a foot $f'$ at its bottom past which the cam 912$^a$ wipes. A portion of said arm extending above its pivot is jointed to the pawl E by a pin or stud $e^3$ in the latter and a short slot in the arm, the latter extending farther upward in front of the cross-rod on which the pawls are pivoted. When the pawl 413$^b$ is swung rearward its forward extension is swung down and through the medium of the spring $e'$ rocks the auxiliary pawl E so as to bring the bottom end edge of the latter over the stud 651 (Fig. 8). This rocking of said pawl E causes rocking of the arm 413$^g$ through the medium of the aforesaid stud or pin $e^3$ and the slot it engages. Thus the foot $f'$ of said arm 413$^g$ is brought into the line of travel of the acting portion of the cam 912$^a$ as illustrated in Fig. 11. When said cam wipes past the foot the arm 413$^g$ is rocked back and through the medium of the slot and pin $e^3$ swings the auxiliary pawl E forward against the stress of the spring $e'$ so as to take the bottom end edge of said pawl out of line with the stud 651 and bring the shoulder $e^2$ into line with said stud as illustrated in Fig. 9.

In the succeeding operation of the machine when the rack is restored to normal of course the stud 651 will be carried down past the lower end of the auxiliary pawl E whereupon the spring $e'$ will rock the latter back to a position shown in Fig. 8 and correspondingly rock the arm 413$^g$ but the foot of the latter will be again withdrawn from the line of travel of the acting portion of the cam 912$^a$ by reason of the stud 651 passing on down below the pawl 413$^b$ and the latter being unlatched in the ordinary way and restored to normal by its own spring 413$^h$, the foot of the pawl 413$^b$ being then brought into line with the acting portion of the cam 912$^a$ as shown in Fig. 12, where the foot $f'$ of the arm 413$^g$ is shown withdrawn from the path of travel of said cam (see also Fig. 10).

Fig. 25 shows an example of work in which 99 tons, 99 cwt., 3 quarters and 28 pounds is registered four times in succession, the successive registration of pounds resulting in carries to the quarters wheel so that the pounds wheels will be left at zero, the successive registration of three quarters in connection with the 28 pounds registrations causing carries to the units of cwt. wheel and the latter carrying to the tens of cwt. wheel and this wheel carrying to the units of tons wheel and the latter to the tens of tons wheel and the tens of ton wheel to the hundreds of tons wheel, so that the total is 400 pounds.

The explanation of absence of ciphers in the totals shown by examples in Figs. 22, 23, 24, 25, is that the hammer latches 717, Fig. 21, have the familiar split characteristic. Thus, the overlapping tails of the units of tens latch, the units of cwt. latch and the quarters latch are omitted. The overlapping tails of other latches are designated by the letter $t$.

Inasmuch as the racks for the units of pounds and the tens of pounds wheels have slots of double length, as hereinbefore explained, it is obvious that the corresponding levers 611 may partake of more movement relative to the racks than others of the levers 611 and this must of course be taken into consideration in connection with the positioning of type 618 on the rear ends of the levers 611. By reference to Fig. 1 it will be seen that normally the types on those two levers occupy positions a step lower down than types of the other levers. This provides for presenting the zero types of these two levers at the printing line by movement of the levers approximately twice the distance that other levers move in presenting zero types at the printing line.

It may be desirable to prevent depression of the 2 key in the tens of pounds row and the 9 key in the units of pounds row at the same time, it being preferable to set up such an amount as 1 quarter and 1 pound so that the printed record would show a result corresponding to that registered on the wheels. Therefore special interlocking devices are provided for the purpose as follows: In Figs. 19 and 20 a lock strip S is shown extending between the two keys in question and arranged to slide lengthwise in suitable guides. The keys as usual act upon bell cranks 217 which engage the familiar detent strips 214. The particular bell cranks associated with the above mentioned keys are specially provided with laterally projecting pins or studs $217^a$ and $217^b$ respectively to operate upon the lock strip S. The latter is formed at opposite ends with depending portions having cam edges $s$ $s'$ one or the other of which normally stand ready to be engaged by a bell crank stud upon depression of the associated key. In Fig. 19 the stud $217^a$ is shown above the cam edge $s$, the latter having been forced forward by depression of the 9 units key $291^a$ through the medium of its bell-crank 217 whose stud $217^b$ has acted upon the cam edge $s'$. It will be obvious that the 2 tens key $291^b$ cannot now be depressed since rearward movement of the lock strip S, which must accompany depression of said key through action of the stud $217^a$ against the cam edge $s$, cannot take place because of engagement of the other stud $217^b$ with the cam edge $s'$. It will be obvious that if the 2 tens key $291^b$ has been depressed, then the 9 units key $291^a$ cannot be depressed.

Of course the above interlocking devices can be applied if desired to include the units 8 key as well as the 9. Furthermore, aside from the desirability of preventing depression of the 2-key in the tens of pounds row and the 9-key in the units of pounds row at the same time, for reasons already stated, it is further to be observed that the interlocking devices are useful, if not commercially essential, for the purpose of preventing manipulation of keys and operation of the machine, otherwise possible, which would not cause all transfer or carrying actions to ensue that are requisite to full registration of accumulated items.

What is claimed is:

1. In a machine of the class described the combination with accumulating wheels and means for individually and differentially actuating the same; of carrying mechanism associated with each of two adjacent wheels to advance the same, the wheel of higher order adapted to carry to the wheel of lower order.

2. In a machine of the class described the combination with accumulating wheels and means for individually and differentially actuating the same; of carrying mechanism associated with each of two adjacent wheels to advance the same each wheel adapted to carry to the other.

3. In a machine of the class described the combination with accumulating wheels and means for individually and differentially actuating the same; of carrying mechanism associated with each of two adjacent wheels to advance the same, the wheel of higher order adapted to carry to the wheel of lower order a double increment of movement.

4. In a machine of the class described the combination with accumulating wheels and means for individually and differentially actuating the same; of carrying mechanism associated with each of two adjacent wheels to advance the same, one wheel adapted to carry to the other a double increment of movement and that other adapted to carry to the first single increments of movement.

5. In a machine of the class described the combination with accumulating wheels and means for individually and differentially actuating the same; of carrying mechanism associated with each of two adjacent wheels to advance the same, each wheel adapted to carry to the other a double increment of movement.

6. In a machine of the class described the combination with accumulating wheels and means for individually and differentially actuating the same; of carrying mechanism associated with each of two adjacent wheels to advance the same, the wheel of higher order adapted to carry to the wheel of lower order and the latter adapted to carry to the wheel of higher order single or double increments of movement.

7. In a machine of the class described the combination with accumulating wheels and means for individually and differentially actuating the same; of carrying mechanism associated with each of two adjacent wheels to advance the same, the wheel of higher order adapted to carry to the wheel of lower order a double increment of movement and the latter adapted to carry to the wheel of higher order single or double increments of movement.

8. In a machine of the class described the combination with accumulating wheels and means for individually and differentially actuating the same; of duplex carrying mechanism controlled by one wheel and adapted to effect a double increment of movement of the adjacent wheel, and carrying mechanism controlled by the latter and adapted to effect advance movement of the first mentioned wheel.

9. In a machine of the class described the combination with accumulating wheels and means for individually and differentially actuating the same; of duplex carrying mechanism controlled by one wheel and adapted to effect a double increment of movement of the adjacent wheel, and carrying mechanism controlled by the latter and adapted to effect a double increment of movement of the first-mentioned wheel.

10. In a machine of the class described the combination of reciprocating rack carriers, racks slot-pin-spring mounted thereon, pawls to normally limit movement of racks in the adding direction, and adding wheels with projections to displace said pawls, one of the wheels adapted to displace pawls associated with wheels of both higher and lower order.

11. In a machine of the class described the combination of reciprocating rack carriers, racks slot-pin-spring mounted thereon, pawls to normally limit movement of racks in the adding direction, and adding wheels with projections to displace said pawls, one of the wheels adapted to displace pawls associated with wheels of both higher pawls associated with wheels of both higher and lower order and there being two pawls for the rack associated with such wheel both adapted to be displaced by the lower order wheel and one such pawl controlled by the other to limit movement of the rack resultant from displacement of the second pawl and the latter when displaced from such limiting position permitting an additonal increment of movement of the rack.

12. In a machine of the class described the combination of reciprocating rack carriers, racks slot-pin-spring mounted thereon, pawls to normally limit movement of racks in the adding direction, adding wheels with projections to displace said pawls, and means for displacing a lower order pawl by a higher order wheel dependent upon extent of advance of the lower order wheel.

13. In a machine of the class described the combination of reciprocating rack carriers, racks slot-pin-spring mounted thereon, pawls to normally limit movement of racks in the adding direction, adding wheels with projections to displace said pawls, and means for displacing a lower order pawl by a higher order wheel dependent upon extent of advance of the latter wheel.

14. In a machine of the class described the combination of reciprocating rack carriers, racks slot-pin-spring mounted thereon, pawls to normally limit movement of racks in the adding direction, adding wheels with projections to displace said pawls, means for displacing a lower order pawl by a higher order wheel dependent upon extent of advance of the lower order wheel, and means for displacing said lower order pawl dependent upon extent of advance of the higher order wheel.

15. In a machine of the class described the combination of reciprocating rack carriers, racks slot-pin-spring mounted thereon, pawls to normally limit movement of racks in the adding direction, adding wheels with projections to displace said pawls, and means for displacing a lower order pawl by a higher order wheel, the slot in the connection between the lower order rack and its carrier being elongated to permit a double increment of advance of the wheel.

16. In a machine of the class described the combination of reciprocating rack carriers, racks slot-pin-spring mounted thereon, pawls to normally limit movement of racks in the adding direction, and adding wheels with projections to displace said pawls, one of the wheels adapted to displace pawls associated with wheels of both higher and lower order and there being two pawls for the rack associated with such wheel both adapted to be displaced by the lower order wheel and one such pawl controlled by the other to limit movement of the rack resultant from displacement of the second pawl and the latter when displaced from such limiting position permitting an additional increment of movement of the rack, the slot in the connection between said rack and its carrier being elongated.

17. In a machine of the class described the combination of reciprocating rack carriers, racks slot-pin-spring mounted thereon, pawls to normally limit movement of racks in the adding direction, and adding wheels with projections to displace said pawls, one of the wheels adapted to displace pawls associated with wheels of both higher and lower order and there being two pawls for the rack associated with such wheel both adapted to be displaced by the lower order wheel and one such pawl controlled by the other to limit movement of the rack resultant from displacement of the second pawl and the latter when displaced from such limiting position permitting an additional increment of movement of the rack, the slot in the connection between said rack and its carrier being elongated, and the second pawl shouldered and spring-connected to the first.

18. In a machine of the class described the combination of reciprocating rack carriers, racks slot-pin-spring mounted thereon, pawls to normally limit movement of racks in the adding direction, and adding wheels with projections to displace said pawls, one of the wheels adapted to displace pawls associated with wheels of both higher and lower order and there being two pawls for the rack associated with such wheel both adapted to be displaced by the lower order wheel and one such pawl controlled by the other to limit movement of the rack resultant from displacement of the second pawl and the latter when displaced from such limiting position permitting an additional increment of movement of the rack, the slot in the connection between said rack and its carrier being elongated, and the second pawl shouldered and spring-connected to the first and having a pivoted arm coupled to it and constructed to be acted upon by a projection on the lower order wheel when the first pawl has been displaced.

19. In a machine of the class described the combination of reciprocating rack carriers, racks slot-pin-spring mounted thereon, pawls to normally limit movement of racks in the adding direction, adding wheels with projections to displace said pawls, and an auxiliary displacing member for the pawl of a lower order wheel with provisions for its operation by the wheel of next higher order.

20. In a machine of the class described the combination of reciprocating rack carriers, racks slot-pin-spring mounted thereon, pawls to normally limit movement of racks in the adding direction, adding wheels with projections to displace said pawls, and an auxiliary displacing member for the pawl of a lower order wheel with provisions for its operation by the wheel of next higher order under control of the said lower order wheel.

21. In a machine of the class described the combination of reciprocating rack carriers, racks slot-pin-spring mounted thereon, pawls to normally limit movement of racks in the adding direction, adding wheels with projections to displace said pawls, and an auxiliary displacing member for the pawl of a lower order wheel with provisions for its operation by the wheel of next higher order under control of the said lower order wheel when the higher order wheel advances a predetermined extent and also with provisions for operation of said displacing member by said higher order wheel when advanced a step farther and independent of said control by the lower order wheel.

22. In a machine of the class described the combination of reciprocating rack carriers, racks slot-pin-spring mounted thereon, pawls to normally limit movement of racks in the adding direction, adding wheels with projections to displace said pawls, an oscillatory finger constituting an auxiliary displacing member for the pawl of a lower order wheel, a cross head having swivel connection with said arm, and independently movable arms engageable with said crosshead on opposite sides of its swivel-point and operated upon by projections of said lower order wheel and the next higher order wheel respectively to rock the finger through the medium of the said cross-head.

23. In a machine of the class described the combination of reciprocating rack carriers, racks slot-pin-spring mounted thereon, pawls to normally limit movement of racks in the adding direction, adding wheels with projections to displace said pawls, an oscillatory finger constituting an auxiliary displacing member for the pawl of a lower order wheel, a cross head having swivel connection with said arm, and independently movable arms engageable with said crosshead on opposite sides of its swivel-point and operated upon by projections of said lower order wheel and the next higher order wheel respectively to rock the finger through the medium of the said cross-head, the arm associated with the higher order wheel also adapted to directly rock said finger.

FREDERICK WHEAT. [L. S.]

Witnesses:
HERBERT D. JAMESON,
R. WILLIAMS.